United States Patent [19]

Hansen

[11] 4,150,470
[45] Apr. 24, 1979

[54] FIXTURE FOR GAS METER REPAIR

[76] Inventor: Clyde A. Hansen, 2276 Crescent Sq., Rte. 4, Green Bay, Wis. 54303

[21] Appl. No.: 652,068

[22] Filed: Jan. 26, 1976

[51] Int. Cl.² ............................................. B23D 19/10
[52] U.S. Cl. .................................. 29/401 R; 29/281.5
[58] Field of Search ................... 72/272 R; 33/181 R, 33/180 R, 143 M; 269/305, 306, 309; 29/401 R, 407, 281.5, 281.1

[56] References Cited

U.S. PATENT DOCUMENTS

| 878,439 | 2/1908 | Wagniere | 33/178 D |
| 1,888,416 | 11/1932 | Williams | 33/143 M |
| 2,816,489 | 12/1957 | Robbins et al. | 269/309 |

Primary Examiner—Leon Gilden
Attorney, Agent, or Firm—Dennis J. Verhaagh

[57] ABSTRACT

A fixture for holding a gas meter tangent assembly is disclosed said fixture adapted to lock the crank and tangent wrist of said assembly in position whereby the calibration of said assembly can be maintained during disassembly and reassembly.

7 Claims, 8 Drawing Figures

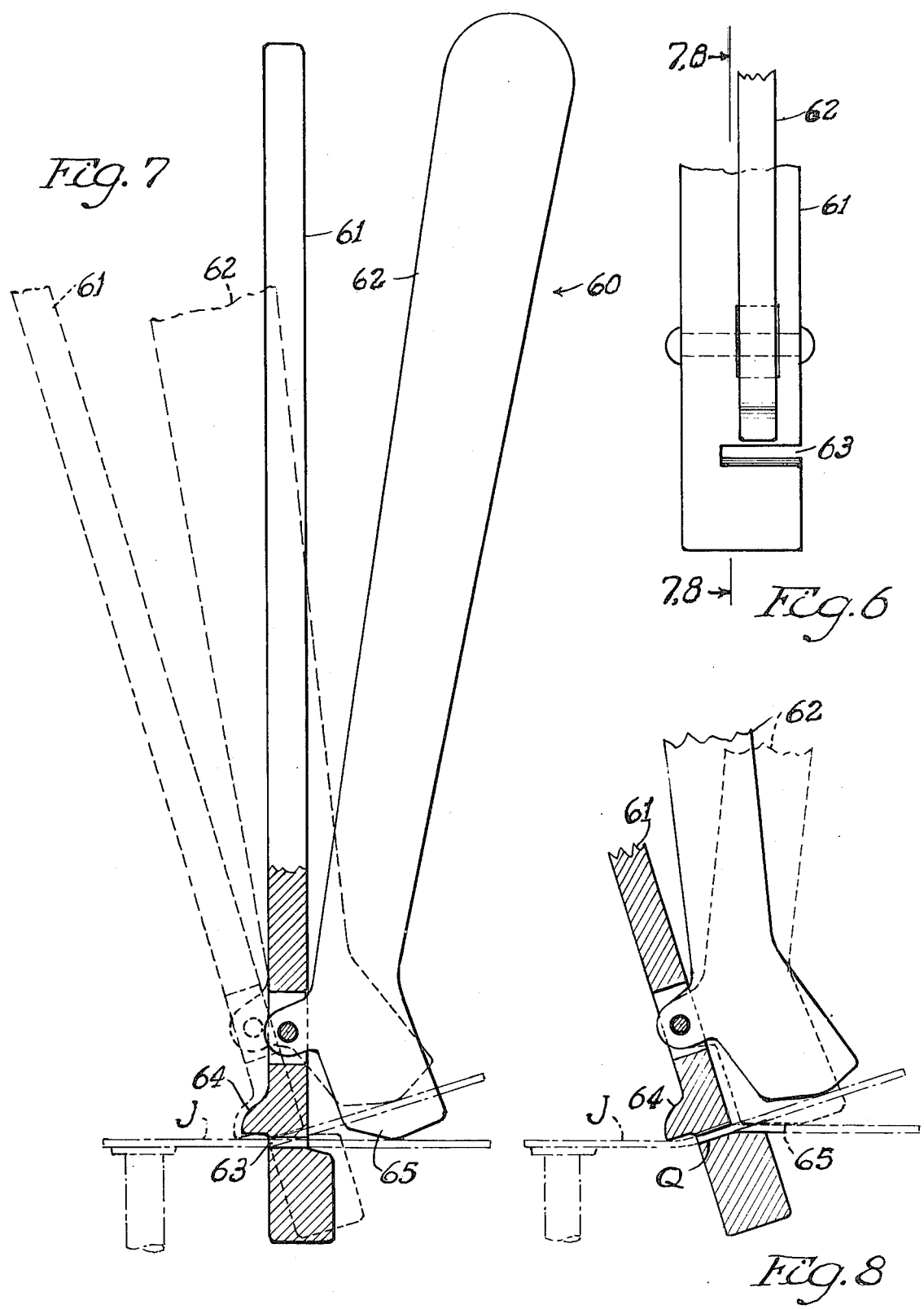

FIXTURE FOR GAS METER REPAIR

BACKGROUND OF THE INVENTION

This invention relates generally to a fixture for holding a hardcase gas meter tangent assembly in a stationary position while repairs to said assembly such as conversion to temperature compensation are being performed and more particularly, concerns a fixture for maintaining the calibration of a gas meter tangent assembly during disassembly and reassembly.

Heretofore, devices for assembly of gas meter tangent assemblies have been provided in the form of conversion kits. Such conversion kits are used primarily in converting non-temperature compensated gas meters to temperature compensated by the replacement of the standard tangent with a temperature compensated tangent. However, tangent assemblies reassembled with such devices have been rendered inaccurate and require much prover time to recalibrate. In addition, most of such devices require the use of new parts in reassembly of said assembly. Also, such devices provide no adjustment for the expansion due to soldering operations employed in assembly. Such devices have been difficult to use and expensive. Accordingly, such devices have not been satisfactory for their intended use.

SUMMARY OF THE INVENTION

The present invention overcomes the above drawbacks through the provisions of a new and improved fixture which holds the tangent unit of a gas meter tangent assembly in such a stationary position with respect to the crank of said assembly that such position can be re-established during the removal and reassembly of the parts of said assembly and thus allows assembly to previous settings.

It is an object of this invention to provide such a fixture to solve the aforementioned problems.

It is a further object of this invention to provide a comparatively versatile fixture which may be easily converted to hold tangent assemblies of different gas meters.

It is a still further object of this invention to provide unique means for standardizing the settings of temperature compensated tangents prior to installation and providing additional means to provide for engagement of flag arms of said meters with temperature compensated tangents mountable in said meters.

These and other objects are preferably accomplished by providing a fixture having means for mounting said tangent assembly so that said assembly is freely rotatable, said fixture having further means to lock said assembly in a fixed position and further means for adjustably locating and maintaining the position of the tangent wrist.

BRIEF DESCRIPTION OF THE DRAWINGS

Other objects and advantages of the invention will become apparent upon reading the following detailed description and appended claims, and upon reference to the accompanying drawings, in which:

FIG. 6 is a partially cut away front view of the flag arm bender;

FIG. 7 is a side elevation of said bender taken substantially along line 7—7 of FIG. 6;

FIG. 8 is another side view of said bender as shown in FIG. 7 showing the method of producing an offset in said flag assemblies.

DESCRIPTION OF THE PREFERRED EMBODIMENT

Figure 1:
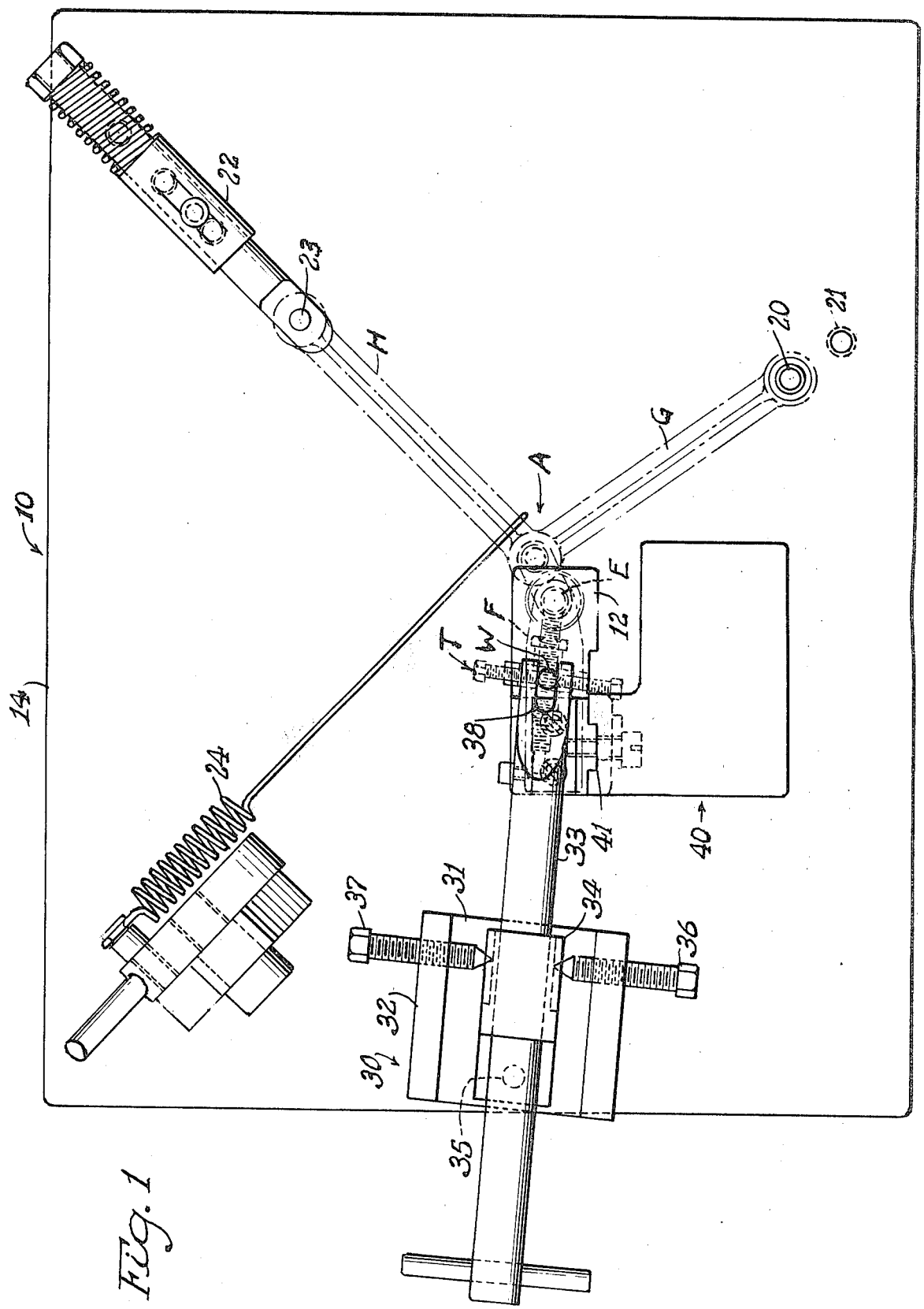
FIG. 1 is a top view of the overall fixture with a standard tangent assembly in place.
Figure 2:
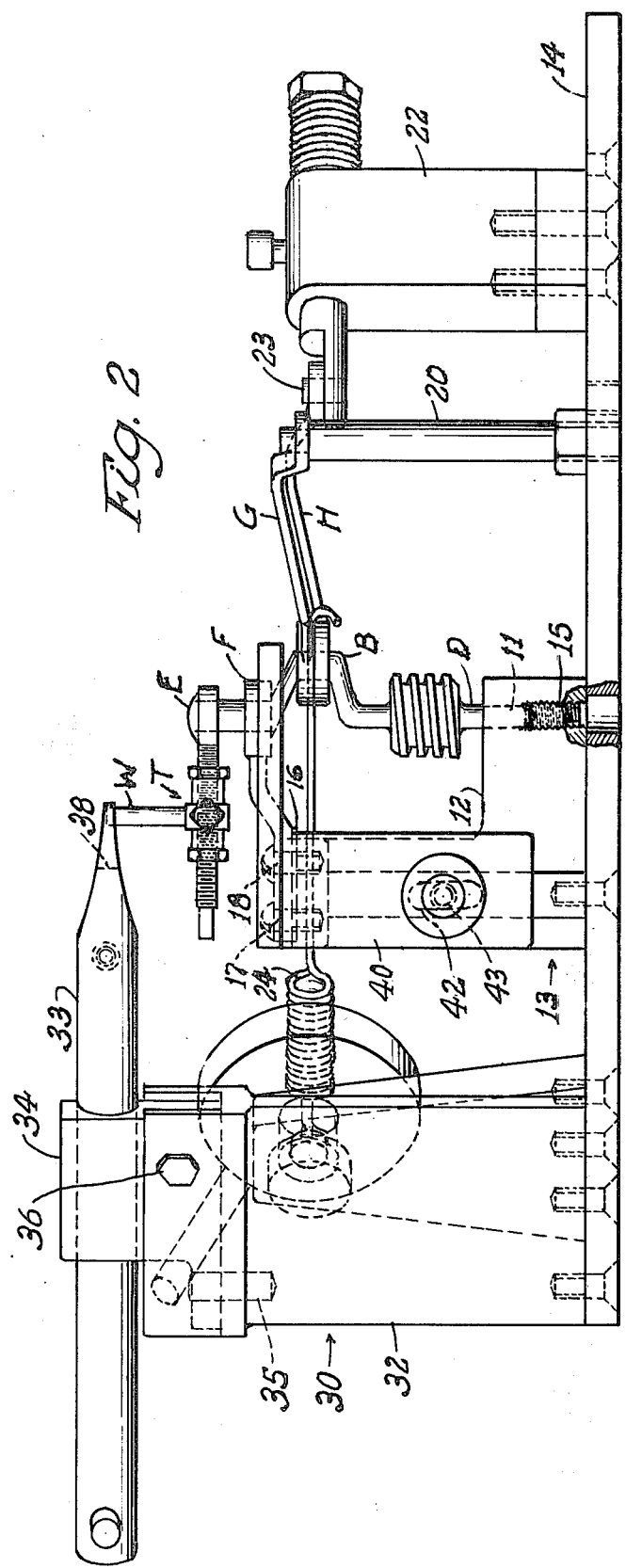
FIG. 2 is a side view of the fixture of FIG. 1.

Turning first to FIG. 1 of the drawings, the invention is shown in conjunction with a standard tangent assembly A which is clamped in a fixture 10 to locate the position of the tangent wrist W. As shown in FIG. 2, the standard tangent assembly A is rotatably carried at its crank end D in preferably a through hole 11 machined into the first step 12 of a table 13 mounted to the base 14 of said fixture 10. The dimension of said hole 11 is the same as the corresponding hole in the gas meter. A screw 15 is provided in said hole 11 to adjust the height of the crank B. The crank frame arm F of most hardcase gas meters contains two mounting holes. The second step 16 of said table 13 contains mounting holes 17 and 18 for said crank frame arm F with the distances between said second step holes 17 and 18 and first step hole 11 machined the same as such distances appear in the gas meter of said tangent assembly.

In the preferred embodiment, the crank arms G and H of the tangent assembly A are used to lock the crank B in position. One of the crank arms G is affixed to a standard 20 which is placed at a distance from the first step hole 11 more than the crank arm length but less than the combined length of said crank arm G and the throw of said crank B. Further, standard holes 21 may be provided for crank arms G of other lengths. As shown in FIG. 1, such a further standard hole 21 would be for crank arms G of longer length than that shown. The second crank arm H is loaded in tension preferably as shown in FIGS. 1 and 2. A spring loaded lock 22 mountable on the base 14 is pinned to the crank arm H at the pin 23 and the spring of said lock 22 is then tensed to impart a load on the crank B in a direction opposite the first crank arm G, thereby locking said crank B into position. Since the lock 22 is spring loaded, the distance from its pin 23 to the first step hole 11 need not be precisely machined. The distance is preferably obtained by mounting the lock onto the base 14 at such a position that the pin 23 can be easily inserted into the crank arm H.

As a further measure to lock the crank B, resilient means are used, preferably a spring 24 mounted as shown in FIGS. 1 and 2 on said base 14 in such a position that it imparts a load in a direction opposite to crank arms G and H. The position of mounting is arbitrary, depending on the length of the spring 24. By such locking means, all the slack in the tangent assembly is taken up.

The tangent wrist W is then located by means of the locator 30. The locator 30 is preferably constructed as shown in FIGS. 1 and 2. A slot 31 is machined into a mounting block 32 which is mounted to the base 14. A locator fork 33 is slidably mounted in a carrier 34 which is pivotable about a pin 35 preferably pressed into said carrier 34 and mountable in said block 32. The carrier 34 and hence the fork 33, is pivotally adjustable about pin 35, preferably by means of adjusting screws 36 and 37 threaded into the block 32. Thus, variances in the position of the fork 33 about the pivot pin 35 can be calculated by counting the number of turns of the adjusting screws 36 and 37. The locator fork 33 is two-pronged and has a slot 38 as shown. The slot 38 is preferably machined in the end of the fork 33 to the same dimension as the flag arm bore of the gas meter. The flag arms drive the tangent assembly A at the tangent wrist W. It is preferable that a slight clearance be allowed between the wrist W and the slot 38 so that inspection for binding can be observed visually. Thus, the tangent wrist W is located by sliding the fork 33 forward to engage the wrist W. The fork 33 can then be withdrawn and the tangent T unsoldered at the crank end E and removed. A replacement tangent T is then assembled to the crank end E, the fork 33 is advanced to register the position of the wrist W and the tangent T is soldered in place.

Figure 3:
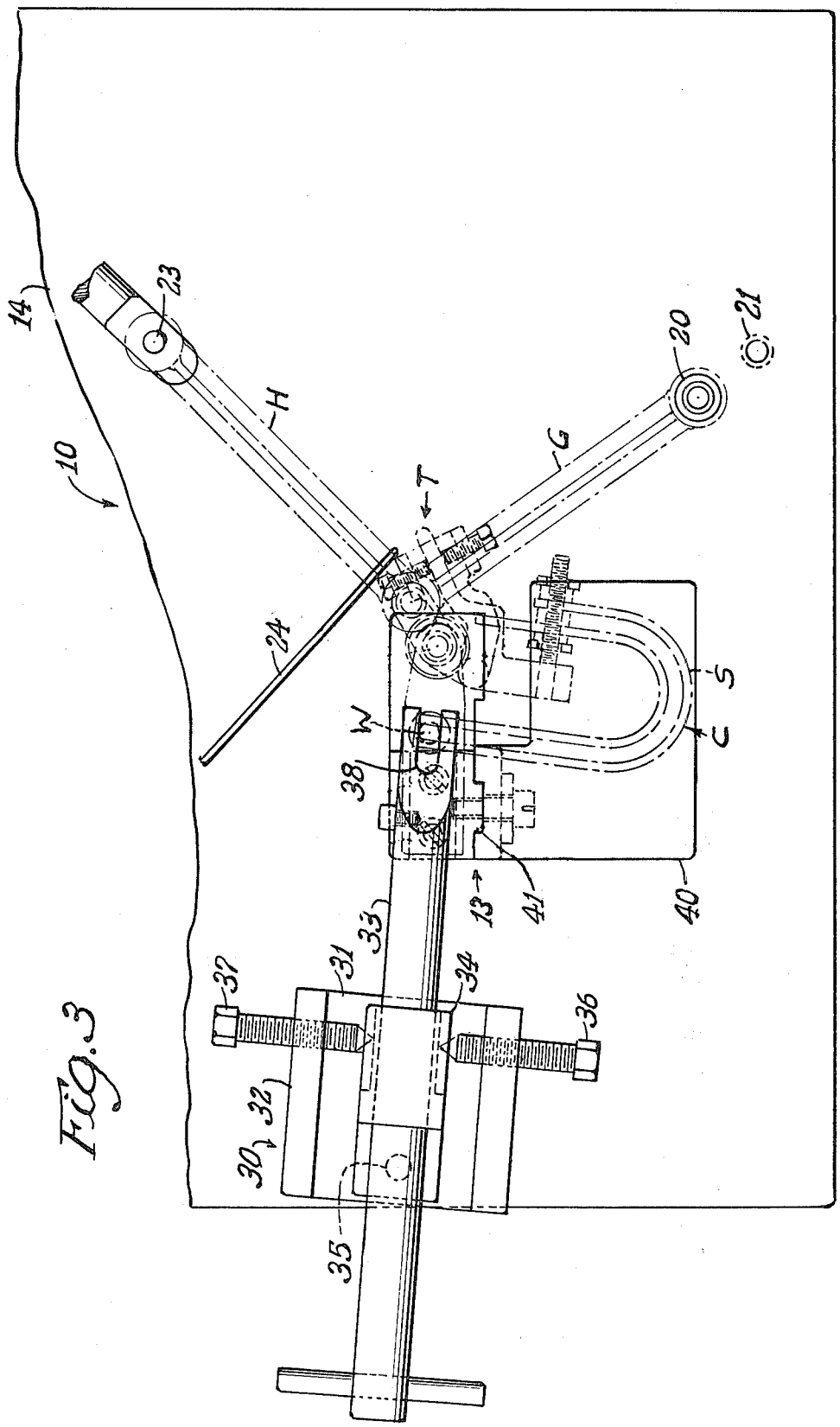
FIG. 3 is a top view of the fixture with a temperature compensated tangent in place.

In accordance with a further aspect of the invention, FIGS. 2 and 3 show as an additional feature of the table 13, an adjustable third step 40. This additional step 40 is provided for the gas meter equipped with a temperature compensated tangent C or for the conversion of a standard gas meter to temperature compensated gas meter. The step 40 is adjustable in a vertical direction. Since temperature compensated tengents C vary in the width of their bimetallic strips S, an adjustment is necessary to position the temperature compensated tangent C to the crank end E. To insure that the centerline of the temperature compensated tangent wrist W is parallel with the centerline of the crank B, the table 13 and the third step 40 preferably have a complemental interlocking tongue and groove 41 so that the third step 40 remains constantly vertical in its adjustment. Adjustment is preferably by means of a slot 42 and screw 43 as shown. Since width variance of strips S is found to be slight, slot 42 length is preferably small.

A peculiar problem associated with assembly of a temperature compensated tangent C is in the expansion of the bimetallic strips S of the temperature compensated tangent C due to the heat of soldering. Because of this expansion the tangent wrist W is not in the same position registered by the fork 33. This change can be easily and accurately measured and adjusted for by measuring the change in position of a temperature compensated tangent wrist W during soldering with screws 36 and 37. Depending on the pitch of the screws 36 and 37 employed, a determinable number of turns will locate the fork 33 to the position of the soldered wrist W. By indexing the fork 33 to that position and soldering the temperature compensated tangent C so that the adjusted fork 33 engages the heated tangent wrist W, the assembly can be assembled without further need for recalibration due to the soldering.

A further embodiment of the invention anticipates the use of the locator 30 of the invention as a separate tool mountable on a gas meter.

Figure 4:
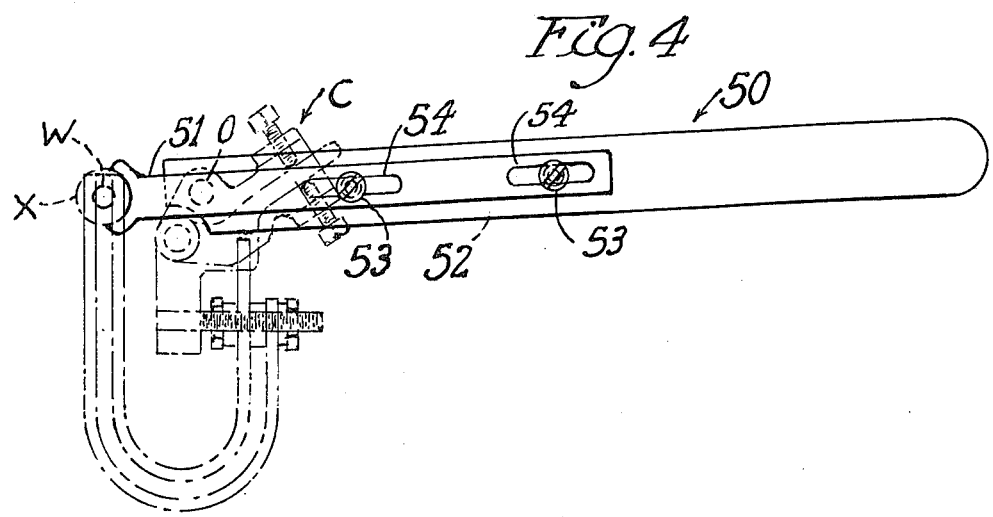
FIG. 4 is a top view of the tangent gauge.
Figure 5:
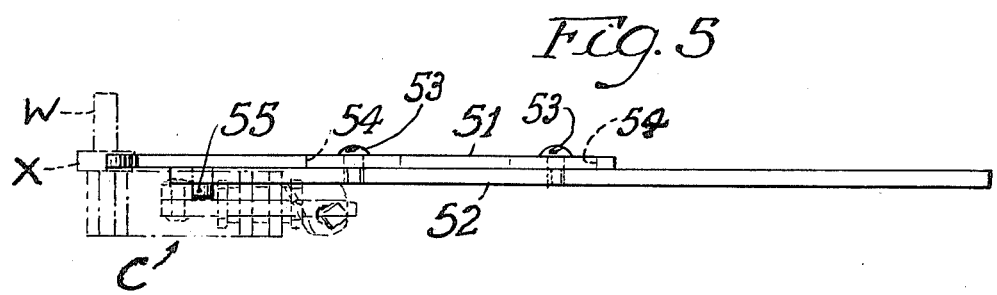
FIG. 5 is a side view of FIG. 4.

Turning to FIGS. 4 and 5, another feature of the invention is shown. A gauge 50 has been found to be necessary to standardize the temperature compensated tangent C for ambient temperature because the distance between the crank end E and the temperature compensated tangent wrist W varies with temperature. The gauge 50 as shown is preferably constructed of a slide bar 51 slidably adjustable on a fixed gauge bar 52 by means of screws 53 adjustable in slots 54 machined preferably in the slide bar 51. A pin 55 mounted at one end of the fixed bar 52 locates the crank hole O of the tangent C. The diameter of the pin 55 is the same as the diameter of the corresponding crank end E.

The slide bar 51 is machined to gauge the tangent wrist W. However, for convenience, it is preferable to gauge to the die cast tangent wrist shoulder X. Very little if anything is lost in the accurcy of the measurement by gauging to said die cast surface X.

The gauge 50 is standardized for ambient temperature by setting the gauge 50 to a "stroke", the distance between the tangent wrist W and the crank end E, determined through a prior meter adjustment to give 100% meter accuracy at ambient temperature.

A further feature of this invention is shown in FIGS. 6, 7 and 8. With the addition of a temperature compensated tangent C to a standard gas meter, the tangent wrist W is in an elevated position in said meter. It has been found to be necessary to raise the height of the flag arms J of the meter which drive the tangent wrist W so that said arms J are engageable with said wrist W and clear the bimatallic strips S. The FIGURES show a pincer 60 with formed jaws 61 and 62. One of the jaws 61 has a slot 63 into which the flag arm J is fit. The first jaw 61 is used to form the first bend of an offset as shown in FIG. 7. The second bend of the offset is produced by the second jaw 62 by closing said pincers 60 as shown in FIG. 8. A face 65 in said second jaw 62 completes the offset Q. The amount of offset is determined by the operator. However, an offset which leaves the flag arm J parallel on either side of the offset and is sufficient to clear the tangent assembly is comtemplated.

The invention has resulted in the saving of a great deal of prover time. Meters converted by other methods have been found to have a greater differential between the open and the check run. Meters converted by means of the fixture of the invention, have had differentials, in the majority of cases, of less than 1% depending upon the condition of the meter.

Thus, it is apparent that there has been provided, in accordance with the invention, a fixture that fully satisfies the objects and advantages set forth. While the invention has been described in conjunction with a specific embodiment, it is evident that other variations will be apparent to those skilled in the art in light of the above description. Accordingly, it is intended to embrace all such variations as fall within the spirit and scope of the appended claims.

I claim:

1. A fixture for mounting a gas meter tangent assembly during repairs, which comprises:
   a base;
   crank mounting means affixed to said base for rotatably mounting the crank end of the assembly so that the tangent wrist of the assembly is in a vertical position and the assembly is mounted above said crank mounting means;
   frame arm mount affixed to said base for fixedly mounting the crank frame arm to the assembly so that the assembly rotates freely in said crank mounting means while it is fixedly mounted on said frame arm mount;
   locator means affixed to said base for adjustably locating and maintaining the position of the tangent wrist of the assembly and having a portion thereof adjustable normally to the tangent wrist of the assembly above the crank mount for indexing with the tangent wrist;
   locking means affixed to said base for locking the crank of the assembly said locking means having portions thereof for engagement with the assembly for locking the crank of the assembly and the taking up slack in it so that said locator means indexes on a rigid, unslacked assembly.

2. The fixture of claim 1, further comprising: means affixed to said base for adjustably positioning a temperature compensated tangent to a tangent assembly with its tangent removed while the assembly is mounted on said crank mounting means so that the tangent wrist of the temperature compensated tangent can be positioned to the same position as the position of the removed tangent wrist.

3. The fixture of claim 1, wherein said locking means includes a fixed standard mounted to said base at a point on said base so that the end of the first crank arm of the tangent assembly is mountable on said stand, resilient means mounted in such a position with respect to said fixed standard on said base that when said resilient means are connected to the second crank arm of the assembly it imparts a tensile load on both crank arms and the slack in the assembly is taken up.

4. The fixture of claim 1, wherein said locating means includes a fork element having a slot opening slightly larger than the diameter of the tangent wrist of the assembly, base affixed means for supporting said fork element at a point above said base so that said fork element can be indexed on the tangent wrist, said fork element being slidably moveable and adjustably pivotable.

5. The fixture of said claim 4 wherein said base affixed means includes a mounting block affixable to said base, a carrier pivotably mounted atop said block having a horizontal hole through which said fork element is slidably moveable to index the tangent wrist of the assembly, and adjustment means mounted on said block for adjusting the pivot setting of said carrier.

6. The fixture of claim 1, further including a gauge associated with said fixture for setting the temperature compensated tangent of the assembly to a standard temperature, said gauge having a gauge bar and slide bar adjustably co-joined, portions of said gauge being formed to engage with parts of the assembly gaugeable to set the distance between the tangent wrist and the crank of the assembly to a predetermined distance, said predetermined distance being that which gives accurate meter performance at ambient temperature, said distance being reestablished on said fixture as the horizontal distance between the center of the tangent wrist at its intersection with said locator means when properly set and the center of the crank end of the assembly when mounted in said crank mounting means.

7. The fixture of claim 1, further including means associated with said fixture to provide sufficient offset in the flag arms of gas meters unequipped with temperature compensated tangent assemblies for providing clearance in installing temperature compensated assemblies in such meters, said clearance raising the flag arm height to the approximate height above the crank mount as the locator means of said fixture.

* * * * *